United States Patent
Gloor et al.

[11] Patent Number: 6,105,265
[45] Date of Patent: Aug. 22, 2000

[54] TILT-COMPENSATING INDICATOR DEVICE FOR A COMPASS

[76] Inventors: Hans Gloor, Schollstrasse 39, CH-2504; Denis Gigon, Rue Centrale 66 CH-2502, both of Bienne, Switzerland

[21] Appl. No.: 08/952,220

[22] PCT Filed: May 29, 1996

[86] PCT No.: PCT/EP96/02303

§ 371 Date: Nov. 26, 1997

§ 102(e) Date: Nov. 26, 1997

[87] PCT Pub. No.: WO96/41127

PCT Pub. Date: Dec. 19, 1996

[30] Foreign Application Priority Data

Jun. 7, 1995 [CH] Switzerland ............... 1661/95
Aug. 16, 1995 [DE] Germany ............... 195 29 975

[51] Int. Cl.[7] ............................................. G01C 17/06
[52] U.S. Cl. ................................ 33/355 R; 33/355 D
[58] Field of Search ................................ 33/355 R, 356, 33/355 D, 402

[56] References Cited

U.S. PATENT DOCUMENTS

| | | | |
|---|---|---|---|
| 2,600,644 | 6/1952 | Hand | 33/355 R |
| 2,610,410 | 9/1952 | Abee-Lund | 33/355 R |
| 4,175,333 | 11/1979 | Kramer | 33/355 R |
| 4,250,626 | 2/1981 | Lazar | 33/355 R |
| 4,357,756 | 11/1982 | Degaeta et al. | 33/355 R |

FOREIGN PATENT DOCUMENTS

| | | |
|---|---|---|
| 663091 | 11/1987 | Switzerland. |
| 683373 | 2/1994 | Switzerland. |
| WO 8503347 | 8/1985 | WIPO. |

*Primary Examiner*—Christopher W. Fulton
*Attorney, Agent, or Firm*—Martin J. Marcus

[57] ABSTRACT

The invention concerns a tilt-compensating indicator device for a compass (100) comprising a magnetic field detection device (20) which is mounted on a conical bearing (7) and is accommodated in a housing (100') of the compass (100). The indicator device (30) is rotatably mounted on the magnetic field detection device (20) by means of a receiving bearing (8,10) whose bearing shaft (8), accommodated in bearing elements (10) of the magnetic field detection device (20), extends substantially at right-angles to the north-south direction of the magnetic field detection device (20).

21 Claims, 2 Drawing Sheets

TILT-COMPENSATING INDICATOR DEVICE FOR A COMPASS

BACKGROUND OF THE INVENTION (a) Field of the Invention

The invention relates to a tilt-compensating indicator device for a compass having a magnetic field detection means which is mounted on a conical pivot bearing and which is located in a housing in the compass.

(b) Description of the Prior Art

A tilt-compensating indicator device of this type is known from CH 683 373 which is owned by the present applicant. This commercially marketed tilt-compensating indicator device, which has proved its usefulness in practice, is separately mounted from the magnetic field detector and is connected with it by means of a dog. This avoids the disadvantages which occur in a customary mechanical compass in which the indicator device is rigidly and directly connected to, or is identical with, the magnetic field detector, namely that when the compass is tilted at a relatively small angle (about 8° to about 12°) an indicator needle or an indicator disc in the indicator device comes into contact with the top or the bottom of the housing. This disturbing effect can also occur due to different inclinations in the magnetic field of the earth when the compass is used at different latitudes. As a result, the compass is no longer able to function properly. Before it is read, it must therefore be brought into a position where the indicator device can once more swing freely. In many applications, e.g., orienteering, it is extremely important that the display can be accurately read as quickly as possible, i.e., without being delayed by having to re-orient the compass. In addition, tilting of the compass can disadvantageously result in bearing errors.

The known type of tilt-compensating indicator device for a compass is capable of eliminating or at least reducing the above-mentioned undesirable effects. However, it possesses the disadvantage that the bearing of the indicator device is costly to construct, and in addition the bearing must be accurately aligned in an axial direction. The axial alignment of the bearing of the indicator device with the bearing of the magnetic field detector is labour intensive.

The compass which is described in U.S. Pat. No. 2,446, 258 is designed in particular for aircraft. It possesses a compass housing in which an indicator device rotates around an axis which is fixed vertically in the housing, in a plane perpendicular to this vertical axis. A frame running parallel to the vertical axis is firmly connected to the indicator device. A magnetic needle acting as a magnetic field detector which rotates via bearing elements around a horizontal axis defined by these bearing elements is mounted in this frame. The mounting of the magnetic needle in the frame ensures that the needle remains parallel to the magnetic field of the earth.

SUMMARY OF THE INVENTION (a) Aims of the Invention

It is therefore one object of the invention further to refine a tilt-compensating indicator device of the type mentioned at the beginning in such a way that, even if the compass housing is tilted at a larger angle, and given different inclinations of the earth's magnetic field, it guarantees an adequately good reading; at the same time, however, the tilt-compensating indicator device according to the invention must be particularly simple in structure.

STATEMENTS OF THE INVENTION

This object is achieved according to the invention, by vertically orienting the pivot bearing in a substantially-vertical plane, by rotatably-mounting the indicator device on the magnetic field detection means by means of a bearing, and by enabling the bearing to interact with bearing elements of the magnetic field detection means so as to be capable of rotating in a substantially-vertical plane, and runs substantially at right angles to the North-South direction of the magnetic field detection means.

A first embodiment of the present invention provides a tilt-compensating indicator device for a compass possessing a magnetic field detection means which is accommodated in a housing of the compass, the detection means being mounted via a conical pivoted bearing on a tip of a shaft which is arranged substantially-perpendicular to a bottom of the housing, the detection means also being capable of rotating in at least a plane which is perpendicular to the direction of the shaft, and the indicator device possessing a non-rigid connection in respect to the movement of the magnetic field detection means in the plane, wherein the non-rigid connection between the indicator device and the magnetic field detection means accomplished by means of bearing elements and wherein one bearing element which is arranged in the magnetic field detection means and which cooperates with the bearings element which is arranged in the indicator device is oriented at right angles to the North-South magnetization of the magnetic field detection means.

A second embodiment of the present invention provides a compass having at least partially transparent housing and possessing a magnetic field detection means accommodated in the housing of the compass, the detector being mounted via a pivot bearing on a top of a shaft which is arranged substatially-perpendicular to a bottom of the housing, the detector also being capable of rotating in at least a plane which is perpendicular to the direction of the shaft, and the indicator device possessing a non-rigid connection in respect to the movement of the magnetic field detection means in the plane, wherein the non-rigid connection between the indicator device and the magnetic field detection means is accomplished by means of bearing elements, and wherein one bearing element, which is arranged in the magnetic field detection means and which cooperates with the other bearing element and which is arranged in the indicator device, is oriented at right angles to the North-South magnetization of the magnetic field detection means.

By means of the invention, a tilt-compensating indicator device for a compass is created in a particularly advantageous way. The indicator device is in an unstable equilibrium and can rotate around the bearing axis in a plane which is orthogonal to the West-East direction of the magnetic field detection means. As a result of this rotatability of the indicator device as provided by the invention, if either the magnetic field detector or the housing of the compass tilt in the North-South direction, the indicator device does not follow the corresponding movement but instead substantially retains its position, so that advantageously the indicator device according to the invention is prevented from coming into contact with the top or bottom of the compass housing. Since the indicator device does not execute any movement around the compass axis when the compass housing is tilted in the East-West direction, it is not necessary to decouple the indicator device from the tilt motion of the magnetic field detection means. Thus, in a particularly simple manner, the features according to this invention permit tile trouble-free operation of a compass equipped with the tilt-compensating indicator device according to this invention over the entire angular range.

(c) Other Features of the Invention

According to an advantageous refinement of this invention, the indicator device, which is preferably designed as an indicator needle or an indicator disc, possesses one or more spacer elements which point towards the top and/or towards the bottom of the housing. Through this feature of this invention, the tilt of the indicator device is limited in an advantageous manner because, once the housing has attained a certain amount of tilt, these spacer elements come into contact with the top and/or with the bottom of the housing. However, the amount of friction generated as a result between tile spacer elements and the top or the bottom of the housing is so low that it does not impair the indicating accuracy of the compass.

According to a further advantageous refinement of the invention, the indicator elements of the indicator device are connected with the bearing axis via annular connecting elements which are designed in such a way that when the permanent magnet system of the magnetic field detection system tilts, this system can pass through a space bounded by the bearing pin and the annular connecting elements. Such a feature has the advantage that, even if the space between the magnetic field detection system and the indicator device is very small, the movement of the latter cannot be hampered by the permanent magnet system of the magnetic field detector.

According to a further advantageous refinement of the invention, the indicator device has the form of an indicator disc which, in an outward direction, is slightly bent towards the bottom of the housing, at least in the East-West orientation of the permanent magnet system and preferably also in the North-South orientation. The advantage of such a feature is that it permits greater tilting of the indicator disc relative to the housing without the indicator disc coming into contact with the top or bottom of the housing.

By one feature of the first embodiment of this invention, the magnetic field detection means possesses a magnet carrier in which the bearing element is provide to recieve a bearing element of the indicator device, the bearing element of the indicator device having the form of a bearing axis or a tilting bearing. By one specific feature thereof, the bearing elements of the magnetic field detection means, which bearing element accepts the bearing axis or the tilting bearing, has the form of holes of V-shaped mounts. By a second specific feature of this feature the bearing axis of the indicator device is formed either as a continuous axis or as two separate radial pins.

By a second feature of this first embodiment of this invention the indicator device possesses two diametrically-opposed points which are connected with the bearing element. By one specific feature of this feature, the pointers of the indicator device are connected with the bearing element of the indicator device via annular connecting elements.

In the above previously-described third feature of the first embodiment of this invention, by one specific feature, where the indicator device possesses at least one spacer element which points towards the top or towards the bottom of the compass housing. By a second specific feature, the indicator device possesses two spacer elements which are arranged symmetrically relative to the centre point, and which point towards the bottom of the compass housing. By a third specific feature, at least one of the spacer elements is provided with a pointed tip. By a fourth specific feature, the spacer element are bent out from the indicator device after they have been shaped by etching or stamping.

By a fourth feature of this first embodiment of the invention, the indicator device has the form of an indicator disc. By one specific feature thereof, the indicator disc possesses at least one spacer element. By a second specific feature thereof, the spacer element of the indicator device is designed as a circular elevation on the indicator disc. By a third specific feature therof, the indicator disc drops towards the bottom of the compass housing in a radially-outward direction.

By a first feature of the second embodiment of this invention, the indicator device is configured according to any of the features as above described.

By a second feature of the second embodiment of this invention, and/or the first feature thereof, the magnetic field detection menas possesses a magnet carrier which is mounted on a pivot bearing and which carries a permanent magnet. By a first specific featureof this feature, the permanent magnet is annular inshape.

By a third feature of this second embodiment of this invention, and/or the first feature thereof, the magnetic carrier in the plane of the pivot bearing possesses a bearing element for the bearing element of the indicator device.

By a fourth of this second embodiment of this invention, and/or th first feature thereof, circular elevations on the top and/or on the bottom of the compass housing act as spacer elements for the indicator device.

BRIEF DESCRIPTION OF THE DRAWINGS

In the accompanying drawings.

Conclusion

From the foregoing description, one skilled in the art can easily ascertain the essential characteristics of this invention, and without departing from the spirit and scope thereof, can make various changes and modifications of the invention to adapt it to various usages andchanges and conditions. Consequently, such changes and modifications are properly, equitably, and "intended" to be, within the full range of equivalence of the following claims.

Figure 1:
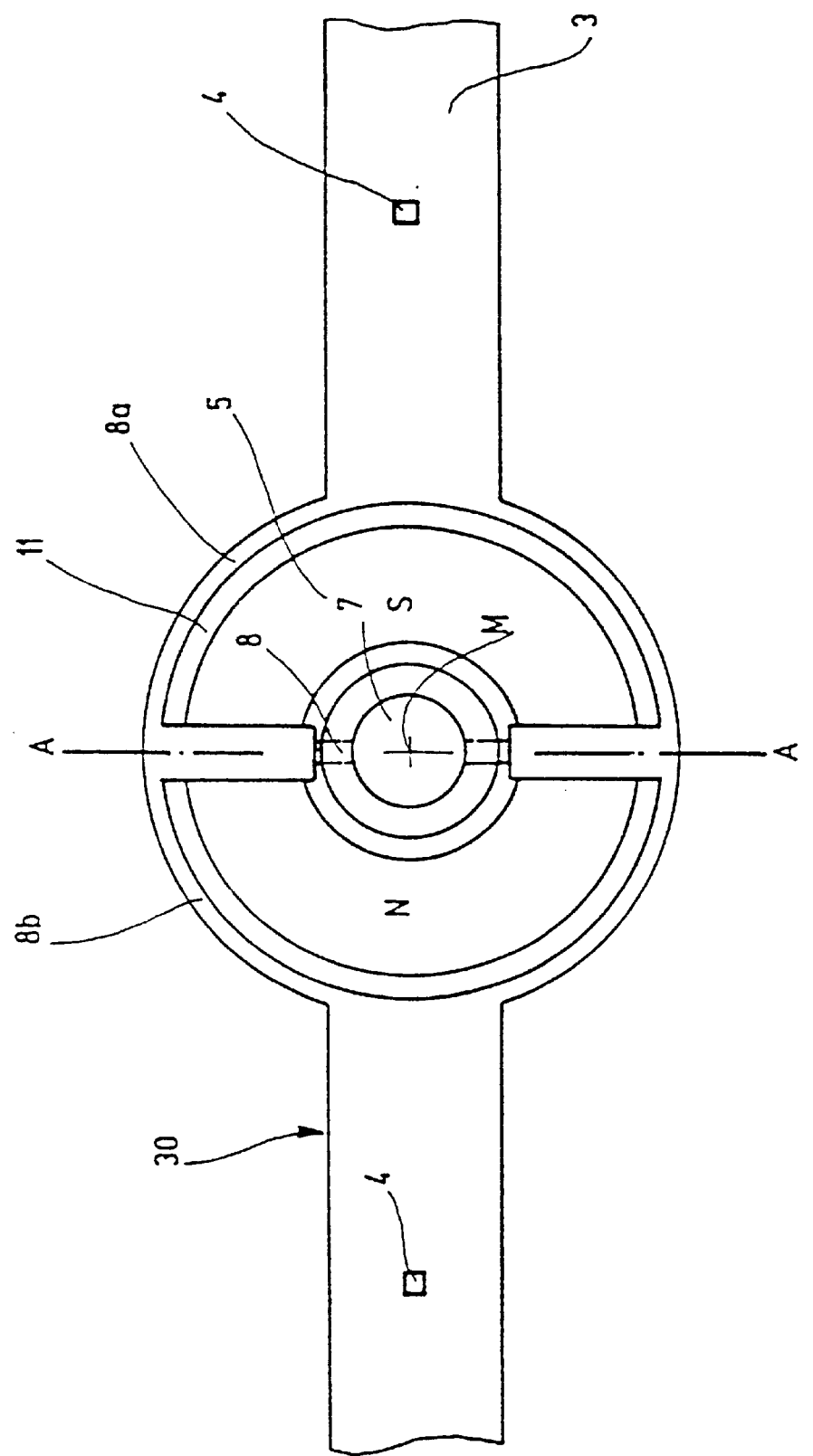
FIG. 1 is a top view of an embodiment of an indicator device according to this invention.
Figure 2:
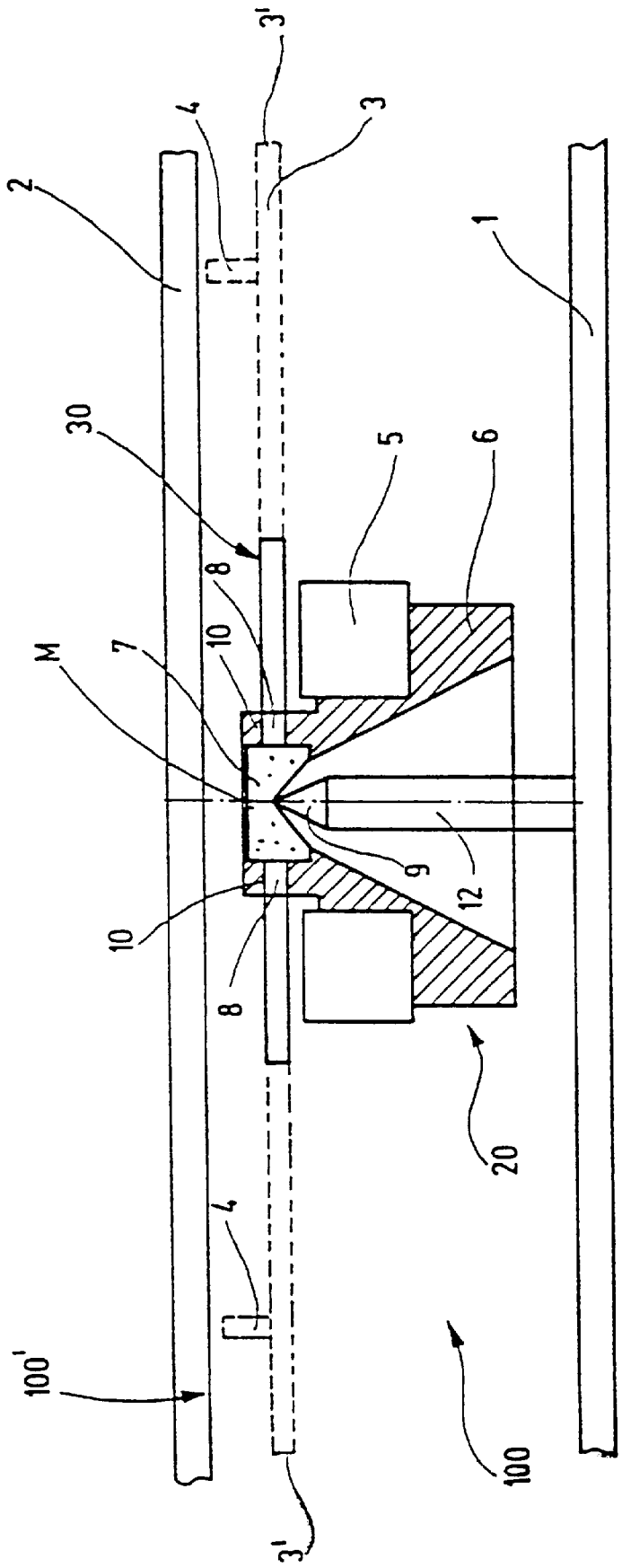
FIG. 2 is a section through a compass using the indicator device shown in FIG. 1, corresponding to a cross section along the line A—A in FIG. 1.

The embodiment of a tilt-compensated indicator device 30 for a compass 100, as depicted in FIGS. 1 and 2, is mounted in a compass housing 100' of which only a transparent top 2 and likewise preferably a transparent bottom 1 are illustrated in FIG. 2. The compass housing 100', which is bounded by the bottom 1 and the top 2, preferably contains a fluid or a gas which serves mainly to damp the movement of the indicator system 30. A magnetic field detector, indicated generally by the reference number 20, is mounted via a pivot bearing 7 located on the tip 9 of a shaft 12 which is attached to the bottom 1. Such magnetic field detection means consists essentially of the pivot bearing 7 which is located on the tip 9 of the shaft 12, the bearing being preferably manufactured from a synthetic ruby, a magnet carrier 6 which is firmly connected to the pivot bearing 7, and a permanent magnet 5 preferably having a cylindrical shape. The pivot bearing 7, together with the tip 9 of the shaft 12, forms a compass bearing exhibiting very low friction and permitting the magnet carrier 6 to move through a large range of travel without coming into contact with any other part of the compass 100.

To prevent any tilt motion of the magnetic field detection means 20 in the North-South direction from being transferred to the indicator device 30, two holes 10 acting as bearing elements are provided in the magnet carrier 6, approximately in the plane of the point of rotation of the pivot bearing 7 around the tip 9. 10 A bearing axis 8 of the indicator device 30 is rotatably mounted in the holes, in the form of a bearing element. The bearing axis 8 is arranged substantially-perpendicular to the North-South direction of the magnetic field detection means 20. The bearing axis 8 of the indicator device 30 is formed either as a continuous axis or as two separate radial pins. It is connected via annular connecting elements 8a, 8b with two pointers 3 which perform the actual indicating function of the indicator device 30.

If the compass housing 100' of the compass 100 is tilted in the North-South direction of the magnetic field detection means 20, the permanent magnet 5 orients itself obliquely to the tip 9 of the shaft 12 which is connected to the bottom 1 of the compass housing 100'. Because of the movable mounting of the indicator device 30 in the holes 10 of the magnet carrier 6 of the magnetic field detection means 20, which holes act as bearing mounts, the movements of the magnetic field detection means 20 and of the indicator device 30 are advantageously not forcibly coupled in this case, so that the indicator device does not follow the movement of the magnetic field detection means 20 which is triggered by the tilt of the housing 100' in the North-South direction of the inclination of the earth's magnetic field. Since, as already mentioned at the beginning, no torque acts on the indicator device 30 when the housing tilts in the West-East direction of the magnetic field detection means 20, and the indicator device thus continues to point in the North-South direction, it is not absolutely necessary to decouple the two devices 20, 30. As a result, the mounting of the indicator device 30 as described above on the bearing axis 8, which is arranged substantially perpendicular to the North-South direction of the magnetic field detection means 20, guarantees in a particularly simple manner that the indicator device 30 can move substantially freely throughout its full angular range.

It is furthermore advantageous in this connection that, when the magnetic field detection means 20 is tilted, its permanent magnet 5 can pass through the gap which is bounded by the annular connecting elements 8a, 8b and the bearing axis 8, so that advantageously it is possible to provide only a small amount of space between the indicator device 30 and the magnetic field detection means 20. Such an arrangement has the advantage that a compass 100 of this type can be particularly compact in construction, and for that reason it can be advantageously used in a flat compass housing 100'.

If sufficient space is available to construct the compass 100, and it is therefore not necessary for the indicator device 30 and the magnetic field detection means 20 to be arranged close together, it is naturally possible also to design the annular disc which is defined by the annular connecting elements 8a, 8b as a full disc, which is less expensive to produce than the design described above.

To prevent the pointers 3 of the indicator device 30 from coming into contact with the bottom 1 or top 2 of the housing 100' if the housing 100' assumes a large angle of tilt, or if the housing 100' of the compass 100 is of very shallow construction, it is advantageously possible to provide one or more spacer elements 4 on the pointers 3 of the indicator device 30, said spacer elements having a preferably pointed configuration, as can best be seen from FIG. 2. These spacer elements 4 are arranged preferably symmetrically on the pointers 3, preferably at a distance relative to the mid-point M of the indicator device 30. These spacer elements 4, which are preferably formed by bending them from the material of the pointers 3 after their shapes have been etched or stamped out, prevent the tips 3' of the pointers 3 from coming into contact with the top 2 and/or the bottom 1 of the compass housing 100' if the compass housing 100' tilts too much. If this happens, the pointed spacer elements 4 come up against the top 2 and/or the bottom 1, thus limiting the tilt movement of the indicator device 30. Although in this case some friction occurs between the spacer elements 4 and the top 2 and/or the bottom 1, and thus affects the movement of the indicator device 30, this friction is so low that the mobility of the indicator device 30 and thus the indicating accuracy of the compass 100 are not impaired.

In the matter of the above-mentioned embodiment, it should be stated conclusively that it may be advantageous for a series of applications if the pointers 3 in the East-West direction of the magnetic field detection means 20 are slightly bent towards the bottom 1, so that the pointers 3 can assume a larger tilt angle relative to the compass housing 100'.

The embodiment of the indicator device 30 with two pointers 3 as illustrated in FIGS. 1 and 2 is not the only one possible. Instead, a number of different configurations are conceivable for the indicator device 30. For example, it should also be mentioned here that the pointers 3 can be replaced by an indicator disc which is essentially the same size in terms of area as the top 2 of the compass housing 100'. In this case it is advantageous if the indicator disc is slightly bent towards the bottom in a radially outward direction, in order to permit a greater tilt angle of the indicator disc relative to the compass 100.

Strictly speaking, it does not need to be stated that the above-mentioned bearing element, which has the form of a bearing axis 8 of the indicator device 30, may also take the form of a tilting (knife-edge bearing). In this case, the U-shaped mount is used instead of the holes 10.

We claim:

1. A tilt-compensating indicator device for a compass possessing a magnetic field detection means which is accommodated in a housing of said compass, said detection means being mounted via a conical pivot bearing on a tip of a shaft which is arranged substantially-perpendicular to a bottom of said housing, said detection means also being capable of rotating in at least a plane which is perpendicular to the direction of said shaft, and said indicator device possessing a non-rigid connection in respect to the movement of said magnetic field detection means in said plane, wherein said non-rigid connection between said indicator device and said magnetic field detection means is accomplished by means of bearing elements, and wherein one said bearing element which is arranged in said magnetic field detection means and which cooperates with said bearing element which is arranged in said indicator device, is oriented at right angles to the North-South magnetization of said magnetic field detection means.

2. A tilt-compensating indicator device according to claim 1, wherein said magnetic field detection means possesses a magnet carrier in which said bearing element is provided to receive a bearing element of said indicator device, said bearing element of said indicator device having the form of a bearing axis or a tilting bearing.

3. A tilt-compensating indicator device according to claim 2, wherein said bearing element of said magnetic field detection means, which bearing element accepts said bearing axis or said tilting bearing, has the form of holes or V-shaped mounts.

4. A tilt-compensating indicator device according to claim 1, wherein said indicator device possesses two diametrically-opposed pointers which are connected with said bearing element.

5. A tilt-compensating indicator device according to claim 4, wherein said pointers of said indicator device are connected with said bearing element of said indicator device via annular connecting elements.

6. A tilt-compensating indicator device according to claim 1, wherein said indicator device possesses at least one spacer element which points towards the top or towards the bottom of said compass housing.

7. A tilt-compensating indicator device according to claim 6, wherein said indicator device possesses spacer elements which are arranged symmetrically relative to the centre point of said indicator device, and which point towards the top of said compass housing.

8. A tilt-compensating indicator device according to claim 6, wherein said indicator device possesses two spacer elements which are arranged symmetrically relative to the centre point, and which point towards the bottom of said compass housing.

9. A tilt-compensating indicator device according to claim 6, wherein at least one of said spacer elements is provided with a pointed tip.

10. A tilt-compensating indicator device according to claim 6, wherein said spacer elements are bent out from said indicator device after they have been shaped by etching or stamping.

11. A tilt-compensating indicator device according to claim 2, wherein said bearing axis of said indicator device is formed either as a continuous axis or as two separate radial pins.

12. A tilt-compensating indicator device according to claim 1, wherein said indicator device has the form of an indicator disc.

13. A tilt-compensating indicator device according to claim 12, wherein said indicator disc possesses at least one spacer element.

14. A tilt-compensating indicator device according to claim 13, wherein said spacer element of said indicator device is designed as a circular elevation on said indicator disc.

15. A tilt-compensating indicator device according to claim 12, wherein said indicator disc drops towards the bottom of said compass housing in a radially-outward direction.

16. A compass having an at least partially transparent housing and possessing a magnetic field detection means accommodated in said housing of said compass, said magnetic field detection means being mounted via a pivot bearing on a tip of a shaft which is arranged substantially-perpendicular to a bottom of said housing, said magnetic field detection means also being capable of rotating in at least a plane perpendicular which is to the direction of the shaft, and an indicator device possessing a non-rigid connection in respect to the movement of said magnetic field detection means in said plane, wherein said non-rigid connection between said indicator device and said magnetic field detection means is accomplished by means of bearing elements, and wherein one said bearing element, which is arranged in said magnetic field detection means and which cooperates with the other said bearing element and which is arranged in said indicator device, is oriented at right angles to the North-South magnetization of said magnetic field detection means.

17. A compass having an at least partially transparent housing and possessing a magnetic field detection means accommodated in said housing of said compass, said magnetic field detection means being mounted via a pivot bearing on a tip of a shaft which is arranged substantially-perpendicular to a bottom of said housing said magnetic field detection means also being capable of rotating in at least a plane perpendicular which is to the direction of the shaft, and an indicator device possessing a non-rigid connection in respect to the movement of said magnetic field detection means in said plane, wherein said non-rigid connection between said indicator device and said magnetic field detection means is accomplished by means of bearing elements, and wherein one said bearing element, which is arranged in said magnetic field detection means and which cooperates with the other said bearing element and which is arranged in said indicator device, is oriented at right angles to the North-South magnetization of said magnetic field detection means, wherein said indicator device is configured according to claim 2.

18. A compass according to claim 16, wherein said magnetic field detection means possesses a magnet carrier which is mounted on a pivot bearing and which carries a permanent magnet.

19. A compass according to claim 18, wherein said permanent magnet is annular in shape.

20. A compass according to claim 16, wherein, in the plane of said pivot bearing, said magnet carrier possesses a bearing element for said bearing element of said indicator device.

21. A compass according claim 16, wherein circular elevations on the top and/or on the bottom of said compass housing act as spacer elements for said indicator device.

* * * * *